United States Patent [19]
Ohara et al.

[11] Patent Number: 5,116,281
[45] Date of Patent: May 26, 1992

[54] ROTATIONAL SPEED SWITCHER

[75] Inventors: Tetsuo Ohara; Tsutomu Miura; Shinichi Hagiwara; Shigeomi Koshimizu; Eiichi Shimizu, all of Kanagawa, Japan

[73] Assignee: Eastman Kodak Company, Rochester, N.Y.

[21] Appl. No.: 682,297

[22] Filed: Apr. 9, 1991

[30] Foreign Application Priority Data

Aug. 23, 1990 [JP] Japan .................. 2-223148

[51] Int. Cl.⁵ ............................................ G03B 1/00
[52] U.S. Cl. .................................................. 474/1
[58] Field of Search ............................. 474/1-7, 474/69, 70

[56] References Cited

U.S. PATENT DOCUMENTS 3,643,896  2/1972  Kadowaki ............... 474/1 X
4,411,397  10/1983  Karsh et al. ............ 474/1 X Primary Examiner—Thuy M. Bui
Attorney, Agent, or Firm—Robert L. Owens

[57] ABSTRACT

A rotational speed switcher which employs a synchronous motor which is low-cost, long-lasting and quiet, and when applied to a printer or document scanning apparatus or the like enables documents to be transported at either of two speeds selected by switching the motor between forward and reverse operating modes without changing the direction of rotation of the drive shafts.

6 Claims, 3 Drawing Sheets

ROTATIONAL SPEED SWITCHER

FIELD OF THE INVENTION

The present invention relates generally to a rotational speed switcher and, more particularly, to a rotational speed switcher for changing the speed of the drive shaft used to drive rollers such as the paper feed rollers of a document scanner or printer or the like.

BACKGROUND OF THE INVENTION

The rotational force of a motor may be used to drive a wide variety of devices. By way of example, the rotational force of motors may be used to drive the paper transport mechanisms of document scanners and printers, to drive the drive mechanisms of video and audio cassette tape recorders, or to provide the motive force for powering cars and ships.

In such applications, the speed at which the paper or tape is transported or at which the vehicle is moved may be controlled by switching the speed of rotation of the motors. Conventionally such rotational speed switchers are constituted by AC or DC servo motors which have built-in speed control capabilities, or by the provision of a gear-changing mechanism operated via a clutch.

Although use of an AC or DC servo motor provides full control over speed, such motors are expensive and are uneconomical and costly to use in applications requiring no more than perhaps two speed settings. Other problems are that AC servo motors are noisy and DC servo motors tend to be short lived. On the other hand, there are also drawbacks to conventional clutch and gear-changing arrangements, which tend to be complex and bulky and therefore increase the overall size of the apparatus in which they are used.

In view of the aforesaid drawbacks of the prior art arrangements, it is desirable to provide a quiet, low-cost two-speed rotational speed switcher which is long-lasting, compact and highly reliable.

SUMMARY OF THE INVENTION

The present invention is directed to a rotational speed switcher having the above described properties. In general, a rotational speed switcher in accordance with the invention comprises a reversible drive motor, an output drive shaft, and first and second speed converters. More specifically, the first speed converter comprises a first speed changing section connected to the drive motor for changing the speed of the motor to a prescribed speed and a first one-way clutch which transmits the rotation of the first speed changing section to the output drive shaft when the drive motor is in a forward mode, thereby rotating the output drive shaft in the driving direction and cutting the transmission of motive power to the output drive shaft when the drive motor is in a reverse mode. Further, the second speed converter comprises a second speed changing section connected to the drive motor for changing the speed of the motor to a prescribed speed and a second one-way clutch which transmits the rotation of the second speed changing section to the drive shaft when the drive motor is in the reverse mode, thereby rotating the drive shaft in the driving direction and cutting the transmission of motive power to the drive shaft when the drive motor is in the forward mode. With the two speed converters, the driving force of the drive motor in both forward and reverse modes is transmitted to the two speed converters via the one-way clutches to rotate the drive shaft in a constant direction while switching between two different speeds.

In the aforesaid rotational speed switcher, when the drive motor is operating in the forward mode the first one-way clutch of the first speed converter engages to transmit to the drive shaft rotational speed as converted by the first speed changing section, thereby rotating the shaft in the driving direction. At this time, the second one-way clutch is used to cut the transmission of driving force to the drive shaft, so the drive shaft is unaffected.

Likewise, when the drive motor is operating in the reverse mode the second one-way clutch of the second speed converter engages to transmit to the drive shaft rotational speed as converted by the second speed changing section, thereby rotating the shaft in the driving direction. In this event, the direction of rotation is passed through a direction conversion section, causing the drive shaft to be rotated in the same direction as the driving direction of the drive motor in the forward mode. At this time, the first one-way clutch is used to cut the transmission of driving force to the drive shaft, so the drive shaft is unaffected.

Thus, in a rotational speed switcher in accordance with the present invention, either of two rotational speeds can be selected while the direction of drive shaft rotation remains the same merely by switching the drive motor between the forward and reverse modes.

Further features of the invention, its nature and various advantages will become more apparent from the accompanying drawings and the following detailed description of several specific embodiments of the invention.

DETAILED DESCRIPTION

Figure 1:
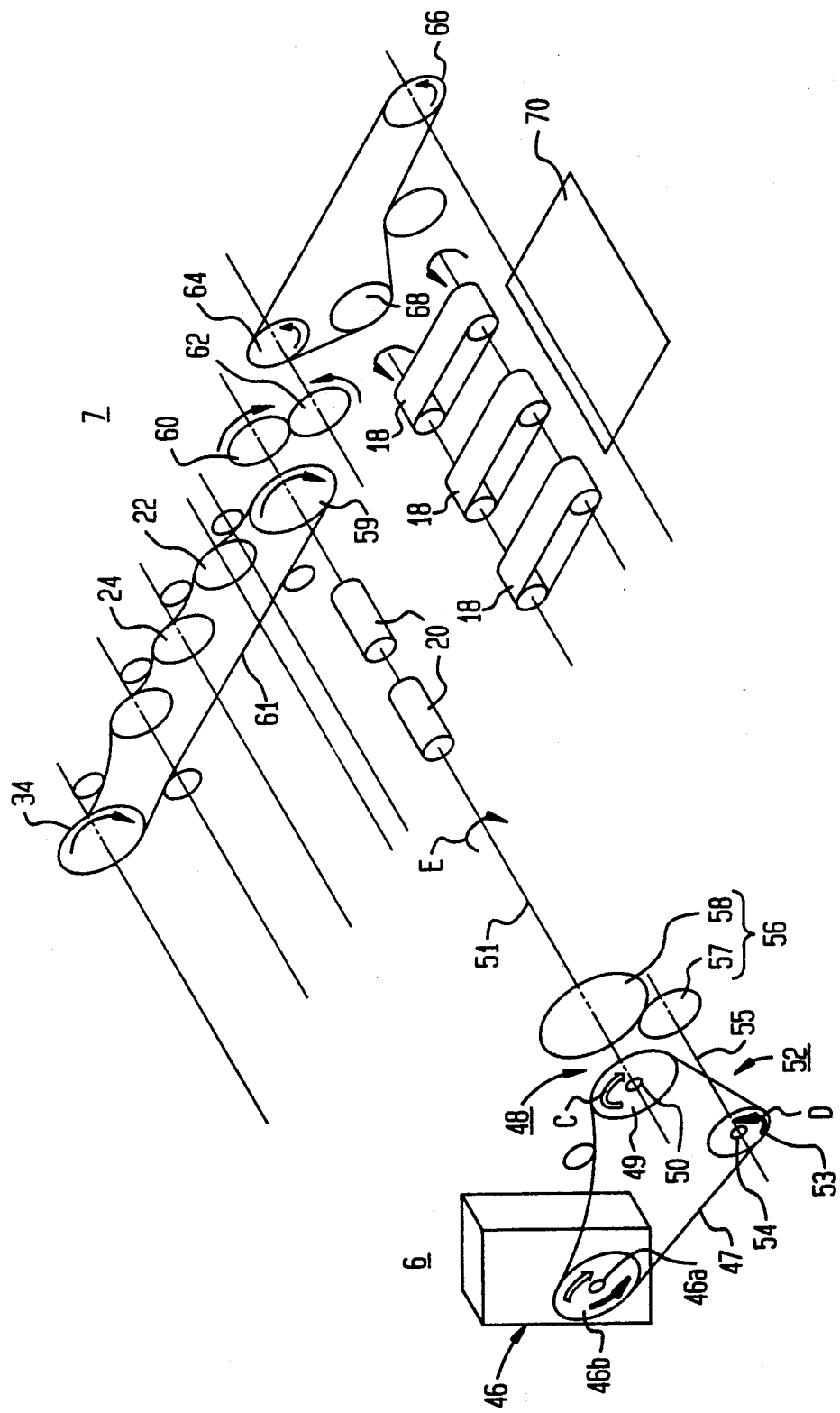
FIG. 1 is an expanded view showing both a rotational speed switcher in accordance with the present invention and portions of some document scanning apparatus with which it may be employed.

The structure of several specific embodiments of the present invention will now be described with reference to the drawing. In these embodiments, a rotational speed switcher in accordance with the invention is applied to the drive shafts of a document transport mechanism used in a document scanner which optically scans documents and converts the document images to digital data. However, it is to be understood that these embodiments are presented as examples to illustrate the principles of the invention and that the invention is not limited in its applicability to these examples alone.

Figure 3:
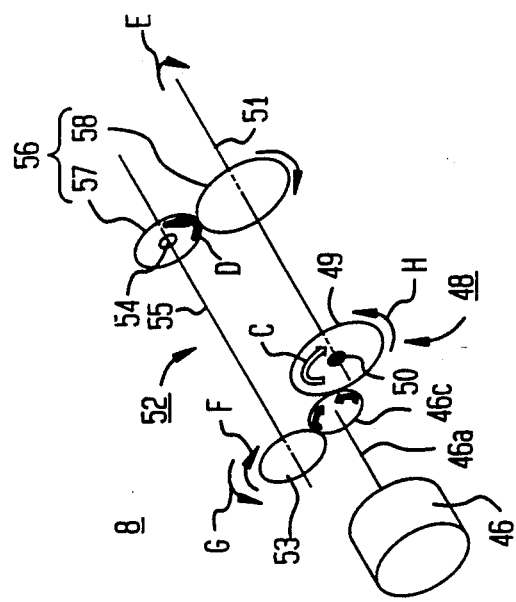
FIG. 3 is an expanded view showing an alternative rotational speed switcher in accordance with the invention.
Figure 4:
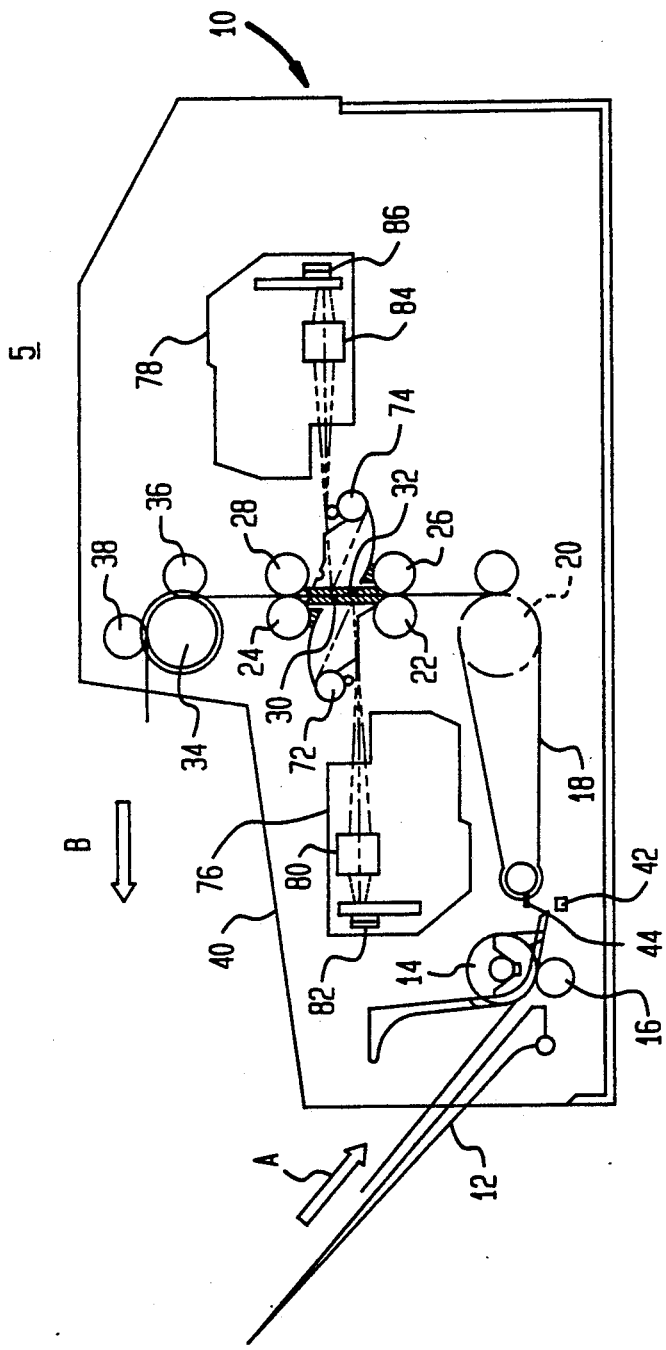
FIG. 4 is a diagram showing the general configuration of a document scanner with which either of the rotational speed switchers shown in FIGS. 1 and 3 may be employed.

FIG. 4 shows the general configuration of a document scanner 5 which may be used in connection with either of the illustrated embodiments of the invention, which are shown as rotational switcher 6 in FIG. 1 and rotational switcher 8 in FIG. 3. The document path of the illustrated scanning apparatus has a horizontal intake and a vertical eject and is divided into a document supply section, scanning section and eject section. In order to avoid unnecessary drawing clutter, these sections have not been given specific reference numerals, but their identity will be readily apparent from the ensuing description.

To realize the above described document path, the document scanner 5 uses a rotational speed switcher which may, for example, be rotational speed switcher 6 in FIG. 1 or ratational speed switcher 8 in FIG. 3. A motor 46 (shown in FIGS. 1 and 2) provides the motive power which, via an arrangement of gear wheels and pulleys, moves the documents along the path. The speed at which the documents are transported is changed by toggling the motor 46 between forward and reverse modes.

The document path configuration will now be described with reference to FIG. 4. Documents to be scanned are stacked in a document feed tray 12 which extends from a case 10. Provided near the document feed tray 12 are a feed roller 14 and a retard roller 16, arranged vertically opposite to each other. The topmost document is drawn into the apparatus in the direction indicated by arrow A by the counterclockwise rotation of the feed roller 14, while at the same time the counterclockwise rotation of the retard roller 16 serves to urge the documents below the topmost one back towards the document feed tray 12.

The feed path continues with a horizontal feed belt 18, which conveys the document to turn rollers 20. The turn rollers 20 mark the end of the feed path and the beginning of the vertical path. In the vertical path the document enters the scanning path, which includes a first aperture roller 22 and a second aperture roller 24, and corresponding nip rollers 26 and 28. As the document passes the first and second aperture rollers 22 and 24, it is scanned between first and second aperture plates 30 and 32. From the scanning section of the path the document enters the ejection section which is provided with a pair of nip rollers 36 and 38 which press against a corrugated roller 34. The document passes between the nip rollers 36 and 38 and the corrugated roller 34 and is thereby moved forward and ejected in the direction indicated by arrow B into a stocker 40.

The document path thus arranged is provided with sensors to check that documents are drawn into, and ejected from, the apparatus correctly. In the illustrated apparatus, an input side document sensor 42 is provided just before the feed belt 18. This document sensor 42 is an optical one constituted of a light emitter (not otherwise shown) and a light receiver (not otherwise shown). A reflector 44 is provided above the document path. A vertical beam of light from the document sensor 42 is projected up through the document path to impinge on the reflector 44. Therefore, when there is no document to interrupt the beam, the reflector 44 reflects the light back to the document sensor 42, while the presence of a document is indicated by the document's interruption of the sensor beam.

In addition, if the speed at which the document is transported is known, the detection of the leading edge of the document by the document sensor 42 can be used to indicate the timing of the document's arrival at the scanning position, as described below.

Figure 2:
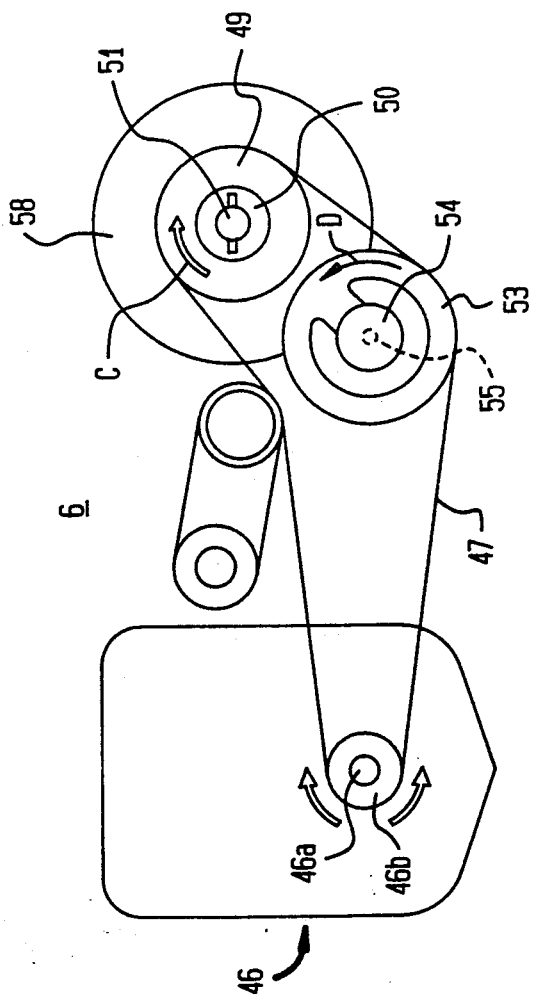
FIG. 2 is a side view of the rotational speed switcher shown in FIG. 1.

At the back of the document scanner is a drive motor (not shown in FIG. 4) for driving each of the document path rollers. FIG. 1 is an expanded view of the drive train arrangement from a rotational speed switcher 6 (generally made up of components 46, 46a, 46b, 47, 48, 49, 50, 51, 52, 53, 54, 55, 56, 57, and 58) to a document transport mechanism 7 (generally made up of components 18, 20, 22, 24, 34, 59, 60, 61, 62, 64, 66, 68, and 70) of the document scanner 5 in FIG. 4, which enables the document transport to be switched between a high speed setting and a low speed setting. FIG. 2 is a side view of the rotational speed switcher 6 of FIG. 1.

The rotational speed switcher 6 in FIG. 1 comprises a drive motor 46 and first and second rotational speed converters 48 and 52. The drive motor 46 is a synchronous motor which can be operated in either a forward or a reverse mode. Compared with speed-adjustable AC or DC servo motors used in conventional arrangements, synchronous motors such as this can only operate at one fixed speed, but have the advantages of low cost, durability and quietness. Affixed to the drive shaft 46a of the motor 46 is a drive pulley 46b for driving a pair of speed converters 48 and 52 via a belt 47.

The first speed converter 48 comprises a first speed changing section 49 and a first one-way clutch 50. The first speed changing section 49 is a pulley (hereinafter also referred to as "pulley 49") to which the rotation of the motor 46 is transmitted via the belt 47. Conversion to a required speed can be effected by the selection of an appropriate ratio between the circumferential length of the pulley 49 and that of the drive pulley 46b.

The first one-way clutch 50 is located at the conjunction between the pulley 49 and an output drive shaft 51 and only transmits motive power when rotation is in one direction of rotation. Here, motive power is only transmitted to the output drive shaft 51 when the motor 46 rotates the pulley 49 in the forward direction, as indicated by the white arrow C, thereby rotating the output drive shaft 51 in the driving direction indicated by arrow E. Motive power is not transmitted when the rotation of the motor 46 is in the opposite direction, indicated by the black arrow D.

The second speed converter 52 comprises a second speed changing section 53, a second one-way clutch 54, and a direction conversion section 56. The second speed changing section 53 is also a pulley (hereinafter also referred to as "pulley 53"), and here too conversion to a required speed is effected by the selection of an appropriate ratio between the circumferential length of the pulley 53 and that of the drive pulley 46b. It is the rotational speed converted by the first rotational speed converter 48 and the second rotational speed converter 52 that is changed.

The second one-way clutch 54 is located at the conjunction between the pulley 53 and a shaft 55. Here, motive power is only transmitted to the shaft 55 when the motor 46 rotates the pulley 53 in the reverse direction, as indicated by the black arrow D. This motive power passes via gear wheels 57 and 58 which comprise the direction conversion section 56, thereby rotating the output drive shaft 51 in the driving direction indicated by the arrow E. On the other hand, when the rotation of the motor 46 is in the opposite direction (the direction indicated by the black arrows) the second one-way clutch 54 prevents the transmission of motive power to the output drive shaft 51.

The second one-way clutch 54 may, alternatively, be located at the gear wheel 57 or gear wheel 58 of the direction conversion section 56 to form an arrangement in which the second one-way clutch 54 transmits motive power to the shaft 55 only when the motor 46 is rotated in the reverse direction (the direction indicated by the black arrows) and does not transmit motive power when the motor 46 is rotated in the opposite direction.

Here the direction conversion section 56 comprises a pair of gear wheels 57 and 58 in mutual engagement, gear wheel 57 being connected to shaft 55 and gear wheel 58 being connected to the output drive shaft 51. Hence, as the rotation of the second rotational speed converter 52, which transmits motive power only when the motor is operating in reverse, is reversed by the gear wheels 57 and 58, the output drive shaft 51 can be kept rotating always in the driving direction indicated by arrow E.

Instead of using ratios between pulleys to effect the function of the second speed changing section, speed conversion can equally well be effected by appropriately varying the gear ratios of the gear wheels 57 and 58 of the direction conversion section 56.

The operation of the rotational speed switcher 6 is as follows. With reference to FIGS. 1 and 2, the forward rotation (indicated by the white arrow) of the drive pulley 46b by the motor 46 causes the pulleys 49 and 53 to be rotated by the belt 47 in the direction indicated by the arrow C. Thus, the first one-way clutch 50 of the first rotational speed conversion means 48 allows the motive power to be transmitted through to the output drive shaft 51 while the second rotational speed conversion means 52 is disengaged by the second one-way clutch 54. The speed at which the drive shaft 51 is rotated is determined by the ratio between the circumferential lengths of the pulleys 49 and 46b.

The rotation of the output drive shaft 51 rotates the gear wheels 57 and 58 of the direction conversion section 56 and the shaft 55 but this has no effect as it is in the direction in which it is not transmitted be the second one-way clutch 54.

The reverse rotation (indicated by the black arrows) of the drive pulley 46b by the motor 46 causes the pulleys 49 and 53 to be rotated by the belt 47 in the direction indicated by the arrow D. Thus, the motive power is transmitted to the shaft 55 by the engagement of the second one-way clutch 54 of the second rotational speed converter 52. As a result, the output drive shaft 51 is rotated in the driving direction via the gear wheels 57 and 58 of the direction conversion section 56, while the first rotational speed converter 48 is disengaged by the first one-way clutch 50. The speed at which the output drive shaft 51 is rotated is determined by the ratio between the circumferential lengths of the pulleys 53 and 46b and the gear ratios of the gear wheels 57 and 58. When the gear wheel 58 is rotating the output drive shaft 51 in the direction indicated by arrow E, this rotation is in the direction in which the first one-way clutch 50 is disengaged.

Thus, with the rotational speed switcher 6 shown in FIGS. 1 and 2, the direction of rotation of the drive shaft 51 remains constant, whether the motor 46 is in forward or reverse mode, and the speed of the output drive shaft 51 can be switched between high and low by switching the motor 46 between forward and reverse modes.

The transmission of the driving power from the output drive shaft 51 to the rollers of the document scanning apparatus will now be described with reference to FIG. 1. The output drive shaft 51 is connected directly to the turn rollers 20. From the turn rollers 20 the driving power is transmitted via a belt 61 from a pulley 59, affixed concentrically with the turn rollers 20, to the first aperture roller 22, the second aperture roller 24 and the corrugated roller 34.

A gear wheel 62 is arranged so that it is in engagement with a gear wheel 60 affixed concentrically with the pulley 59 and a pulley 64 arranged concentrically with the gear wheel 62 is linked to pulleys 66 and 68. Driving power is transmitted from the pulley 66 to the feed roller 14 (FIG. 4) provided inside a feeder unit 70, and from the pulley 68 to feed belts 18.

As described in the foregoing, the rotational speed switcher 6 shown in FIGS. 1 and 2 employs a synchronous motor 46 which is low-cost, long-lasting and quiet. By switching the motor 46 between forward and reverse operating modes, either of two speeds can be selected according to the requirements or circumstances of the particular document scanning application.

The structure of the document scanning section where the document data is acquired will now be described. A shown in FIG. 4, first and second scanning positions are formed in the central part of the respective aperture plates 30 and 32. Light sources 72 and 74 are provided to each project a prescribed beam of light at the scanning positions. In FIG. 4, each of these beams of light is indicated by a dashed line. The reflection of each beam of light from the document corresponds to the brightness of the projected light. The reflected light is guided to the scanning sections, described below, as indicated by dashed lines.

Scanning sections 76 and 78 are provided to read in the light reflected by the document. Specifically, the first scanning section 76 includes a lens system 80 through which light reflected from the first scanning position passes and impinges on a light receiving section 82 to thereby scan one line at a time.

The structure of the second scanning section 78 is substantially the same as that of the first scanning section 76, having a lens system 84 and a light receiving section 86, with light reflecting from the second scanning position passing through the lens system 84 and impinging on the light receiving section 86.

The document scanning operation will now be briefly described. The topmost of the documents stacked in the document feed tray 12 is drawn into the document path by the feed roller 14 while the other documents are held back by the retard roller 16 to sequentially feed the documents into the path one at a time.

When a document is detected by the input side document sensor 42, the document sensor 42 sends a signal to a controller (not shown). The controller puts out a scan start command to each of the scanning sections 76 and 78, with a preset time delay based on the distance between the document sensor 42 to the scanning position and the speed at which the document is moving along the path.

When the document reaches the scanning position, the reflected image data from one or both sides of the document, as required, is input by the scanning sections 76 and 78 and stored. The controller can be made to cause only a part instead of the whole of the document to be scanned by trimming the scanning position. After the document has been scanned it is ejected from the ejection path into the stocker 40. Thus the documents are scanned automatically in a continuous flow.

Using the rotational speed switcher 6 shown in FIGS. 1 and 2 in a document scanning apparatus thus configured (e.g., as shown in FIG. 4) enables the document transport speed to be switched between two speeds easily and reliably simply by switching the drive motor from forward to reverse or vice versa.

Moreover, as a fixed-speed reversible motor is sufficient for the purpose, it is possible to use a synchronous motor which not only costs less than a servo motor but is quieter and lasts longer. In addition, the one-way clutch arrangement means that only two shafts are required compared with the four shafts of conventional systems requiring two speed changing mechanisms, thereby enabling the speed changing mechanism to be made more compact.

FIG. 3 is an expanded view of a second rotational speed switcher 8 in accordance with the invention. The rotational speed switcher 8 may also be used in conjunction with the document scanning apparatus 5 shown in FIG. 4. As can be seen from FIG. 3, the rotational speed switcher 8 also utilizes the forward and reverse operation of a drive motor 46 to power the drive shaft 51 at either of two speeds.

The arrangement of the rotational speed switcher 8 shown in FIG. 3 is substantially the same as that of the rotational speed switcher 6 shown in FIGS. 1 and 2, so a description of parts which are the same is omitted and only the characteristic parts and operation of the rotational speed switcher 8 are described, as follows.

With reference to FIG. 3, a drive gear wheel 46c is affixed to the drive shaft 46a of the motor 46. Two gear wheels comprising a first speed changing section 49 and a second speed changing section 53 are each arranged in engagement with the drive gear wheel 46c, transmitting the driving power to two speed converters 48 and 52. The rotational speed conversion is thus determined by the gear ratio between the respective gear wheels.

The structure of the first speed converter 48 is the same as that of the first speed converter 48 in FIGS. 1 and 2 except that the first speed changing section 49 in FIG. 3 is a gear wheel. Similarly, the structure of the second speed converter 52 is the same as that of the second speed converter 52 in FIGS. 1 and 2 except that the second speed changing section 53 is a gear wheel and the second one-way clutch 54 is provided on the gear wheel 57 of the direction conversion section 56.

The operation of the rotational speed switcher 8 is as follows. With reference to FIG. 3, when the drive gear wheel 46c is rotated by the forward rotation (indicated by the white arrow) of the motor 46, the engagement of the gear wheels causes the gear wheel 49 to rotate in the direction indicated by arrow C and gear wheel 53 to rotate in the direction shown by arrow F. When this happens, the first one-way clutch 50 of the first rotational speed converter 48 allows the motive power to be transmitted straight through to the output drive shaft 51, while the second rotational speed converter 53 is disengaged by the second one-way clutch 54 on the gear wheel 57 of the direction conversion section 56. The speed at which the output drive shaft 51 is rotated is decided by the gear ratio between the gear wheels 46c and 49.

Here, when the output drive shaft 51 rotates the gear wheels 57 and 58 of the direction conversion section 56 rotate, but the action of the second one-way clutch 54 on the gear wheel 57 prevents this affecting the second rotational speed conversion means 52.

When the gear wheel 46c is rotated by the reverse rotation (indicated by the black arrow) of the motor 46 the engagement of the gear wheels causes the gear wheel 53 to rotate in the direction indicated by arrow G and the shaft 55 to rotate in the direction shown by the black arrow D. Thus, the action of the second one-way clutch 54 causes the driving power to be transmitted from gear wheel 57 to gear wheel 58 of the direction conversion section 56, thereby rotating the output drive shaft 51 in the driving direction. At this time, as the gear wheel 49 of the first rotational speed conversion means 48 is rotated in the direction indicated by arrow H, it is not engaged by the first one-way clutch 50. The speed at which the drive shaft 51 is rotated is determined by the gear ratio between gear wheels 46c and 49 and by the gear ratio between gear wheels 57 and 58.

When the gear wheel 58 is rotating the output drive shaft 51 in the direction indicated by arrow E, this rotation is in the direction in which the first one-way clutch 50 is disengaged and therefore does not affect the first rotational speed converter 48.

Thus, with the rotational speed switcher 8 arranged as in FIG. 3, the direction of rotation of the output drive shaft 51 remains constant whether the motor 46 is in forward or reverse mode, and the speed of the output drive shaft 51 can be switched between high and low by switching the motor 46 between forward and reverse modes.

The transmission of the driving power from the drive shaft 51 to the rollers of the document scanning apparatus, and the operation of the scanning apparatus, are the same as in FIGS. 1 and 2 and the description thereof is therefore omitted here.

As described in the foregoing, the rotational speed switcher 8 of FIG. 3 can employ a synchronous motor which is low-cost, long-lasting and quiet, and either of two speeds can be selected by switching the motor between forward and reverse operating modes.

It is to be understood that the embodiments of the invention which have been described are illustrative. Numerous other arrangements and modifications may be readily devised by those skilled in the art without departing from the spirit and scope of the invention.

What is claimed is:

1. A rotational speed switcher comprising:
    a reversible drive motor;
    an output drive shaft;
    a first speed converter which comprises a first speed changing section connected to the drive motor for changing the speed of the motor to a prescribed speed and a first one-way clutch which transmits the rotation of the first speed changing section to the output drive shaft when the drive motor is in a forward mode, thereby rotating the output drive shaft in a driving direction and cutting the transmission of motive power to the output drive shaft when the drive motor is in a reverse mode; and
    a second speed converter which comprises a second speed changing section connected to the drive motor for changing the speed of the motor to a prescribed speed and a second one-way clutch which transmits the rotation of the second speed changing section to the output drive shaft when the drive motor is in a reverse mode, thereby rotating the drive shaft in the driving direction and cutting the transmission of motive power to the output drive shaft when the drive motor is in a forward mode;
    whereby the driving force of the drive motor in both forward and reverse modes is transmitted to the two speed conversion means via the one-way clutches to rotate the output drive shaft in a constant direction while switching between two different speeds.

2. The rotational speed switcher of claim 1 in combination with a document scanner having at least one set of turn rollers that are powered by the output drive shaft.

3. A rotational speed switcher comprising:
a reversible drive motor having a drive pulley and a belt;
an output drive shaft;
a first speed converter which comprises a first speed changing section connected to the drive motor for changing the speed of the motor to a prescribed speed and a first one-way clutch which transmits the rotation of the first speed changing section to the output drive shaft when the drive motor is in a forward mode, thereby rotating the output drive shaft in the driving direction and cutting the transmission of motive power to the output drive shaft when the drive motor is in a reverse mode;
the first speed changing section comprising a first pulley to which the rotation of the motor is transmitted from the drive pulley via the belt; and
a second speed converter which comprises a second speed changing section connected to the drive motor for changing the speed of the motor to a prescribed speed and a second one-way clutch which transmits the rotation of the second speed changing section to the output drive shaft when the drive motor is in a reverse mode, thereby rotating the output drive shaft in the driving direction and cutting the transmission of motive power to the output drive shaft when the drive motor is in a forward mode;
the second speed changing section comprising a second pulley to which the rotation of the motor is transmitted from the drive pulley via the belt;
whereby the driving force of the drive motor in both forward and reverse modes is transmitted to the two speed conversion means via the one-way clutches to rotate the output drive shaft in a constant direction while switching between two different speeds.

4. The rotational speed switcher of claim 3 in combination with a document scanner having at least one set of turn rollers that are powered by the output drive shaft.

5. A rotational speed switcher comprising:
a reversible drive motor having a drive gear wheel;
an output drive shaft;
a first speed converter which comprises a first speed changing section connected to the drive motor for changing the speed of the motor to a prescribed speed and a first one-way clutch which transmits the rotation of the first speed changing section to the output drive shaft when the drive motor is in a forward mode, thereby rotating the output drive shaft in the driving direction and cutting the transmission of motive power to the output drive shaft when the drive motor is in a reverse mode;
the first speed changing section comprising a first gear wheel to which the rotation of the motor is transmitted from the motor via the drive gear wheel; and
a second speed converter which comprises a second speed changing section connected to the drive motor for changing the speed of the motor to a prescribed speed and a second one-way clutch which transmits the rotation of the second speed changing section to the output drive shaft when the drive motor is in a reverse mode, thereby rotating the output drive shaft in the driving direction and cutting the transmission of motive power to the output drive shaft when the drive motor is in a forward mode;
the second speed changing section comprising a second gear wheel to which the rotation of the motor is transmitted via the drive gear wheel;
whereby the driving force of the drive motor in both forward and reverse modes is transmitted to the two speed conversion means via the one-way clutches to rotate the output drive shaft in a constant direction while switching between two different speeds.

6. The rotational speed switcher of claim 5 in combination with a document scanner having at least one set of turn rollers that are powered by the output drive shaft.

* * * * *